United States Patent [19]

Kasajima et al.

[11] Patent Number: 5,794,741

[45] Date of Patent: Aug. 18, 1998

[54] INSTALLATION RING FOR MOUNTING PRESSURIZED FLUID BUFFER DEVICE AND FABRICATION METHOD THEREFOR

[75] Inventors: Kimihisa Kasajima; Seiji Iwasawa, both of Atsugi, Japan

[73] Assignees: Nissan Motor Co., Ltd.; Keiaisha Seisakuso Co., Ltd., both of Kanagawa, Japan

[21] Appl. No.: 551,731

[22] Filed: Nov. 1, 1995

[30] Foreign Application Priority Data

Nov. 1, 1994 [JP] Japan ................. 6-292267

[51] Int. Cl.[6] .................................................. R60G 13/00
[52] U.S. Cl. .................... 188/321.11; 267/220; 267/293; 403/221
[58] Field of Search ................... 188/321.11; 267/220, 267/269, 270, 292, 293, 141, 141.2, 141.3, 141.7, 153; 403/225, 221, 222; 248/635; 280/660, 728.2

[56] References Cited

U.S. PATENT DOCUMENTS

| | | | |
|---|---|---|---|
| 1,541,276 | 6/1925 | Powell | 267/270 |
| 2,021,193 | 11/1935 | Mitchell | 403/222 |
| 2,112,914 | 4/1938 | Leighton | 267/220 |
| 2,149,763 | 3/1939 | Focht | 403/221 |
| 2,297,483 | 9/1942 | Kuhne | 267/270 |
| 2,362,008 | 11/1944 | Hile . | |
| 2,474,431 | 6/1949 | Lipman et al. | 403/222 |
| 2,790,659 | 4/1957 | Malone et al. | 267/220 |
| 2,927,786 | 3/1960 | Templeton | 403/221 |
| 3,190,400 | 6/1965 | Schultze . | |
| 3,503,474 | 3/1970 | Raab | 188/321.11 |
| 3,655,017 | 4/1972 | Lorcher et al. | 188/321.11 |
| 3,679,029 | 7/1972 | Thomas | 188/321.11 |
| 3,799,481 | 3/1974 | Anderson | 188/321.11 |
| 3,976,338 | 8/1976 | Trachte et al. | 403/221 |
| 4,020,929 | 5/1977 | Goldin | 188/321.11 |
| 4,962,834 | 10/1990 | Miner | 188/321.11 |
| 5,193,787 | 3/1993 | Coopland, Jr. | 267/293 |
| 5,222,580 | 6/1993 | Wang | 188/321.11 |
| 5,288,059 | 2/1994 | Gautheron et al. | 267/141.2 |
| 5,413,374 | 5/1995 | Pierce | 403/225 |
| 5,419,032 | 5/1995 | Rytych . | |

FOREIGN PATENT DOCUMENTS

| | | | |
|---|---|---|---|
| 0524843 | 1/1993 | European Pat. Off. . | |
| 1117113 | 6/1950 | France | 403/221 |
| 833001 | 3/1952 | Germany | 188/321.11 |
| 1016067 | 9/1957 | Germany . | |
| 1480405 | 4/1969 | Germany | 188/321.11 |
| 2653006 | 5/1977 | Germany | 188/321.11 |
| 4207781 | 9/1993 | Germany . | |
| 5518629 | 7/1989 | Japan . | |
| 0014937 | 1/1991 | Japan | 188/321.11 |
| 0037441 | 2/1991 | Japan | 188/321.11 |
| 647413 | 12/1950 | United Kingdom | 188/321.11 |
| 869368 | 5/1961 | United Kingdom | 267/270 |
| 1167010 | 10/1969 | United Kingdom | 188/321.11 |
| 2277893 | 11/1994 | United Kingdom . | |

*Primary Examiner*—Douglas C. Butler
*Attorney, Agent, or Firm*—Foley & Lardner

[57] ABSTRACT

An installation ring, for a pressurized fluid buffer device such as a shock absorber or the like is formed of a single piece of base material having a uniform thickness. The ring may be initially formed as a flat article having surface contours formed by pressing or the like to provide a central longitudinally extending raised area and raised longitudinal edges. When the flat article is subject to bending processing into an annular shape for installation around an eye bush, opposed edges thereof meet at a position which is selected as an attachment position for a base portion of the buffer device. Thus, attachment of end portions of the installation ring and attachment of the buffer device thereto mat be accomplished in a single step. Alternatively, a base material havinge uniform thickness may be subject to punching and bending processing and such techniques as utilized for pipe making, for example, and the installation ring may be formed around a central axis for forming the installation ring in a single process in an integral, annular form. Thus, strength is improved while installation processing is reduced. According to utilizing a single thickness base material, both manufacturing and installation costs may be significantly reduced while structural features and design flexibility are improved.

5 Claims, 6 Drawing Sheets

INSTALLATION RING FOR MOUNTING PRESSURIZED FLUID BUFFER DEVICE AND FABRICATION METHOD THEREFOR

FIELD OF THE INVENTION

The present invention relates to an installation ring for a pressurized fluid buffer device, which may include such devices as hydraulic shock absorbers for automotive vehicle, or the like.

DESCRIPTION OF THE RELATED ART

Generally, an installation ring is utilized for retaining pressurized fluid buffer devices such as automotive shock absorbers. One such conventional installation ring will be described herein below with reference to FIGS. 9 and 10. Such an installation arrangement has been disclosed in Japanese Utility Model Publication 55-18629.

Figure 9:
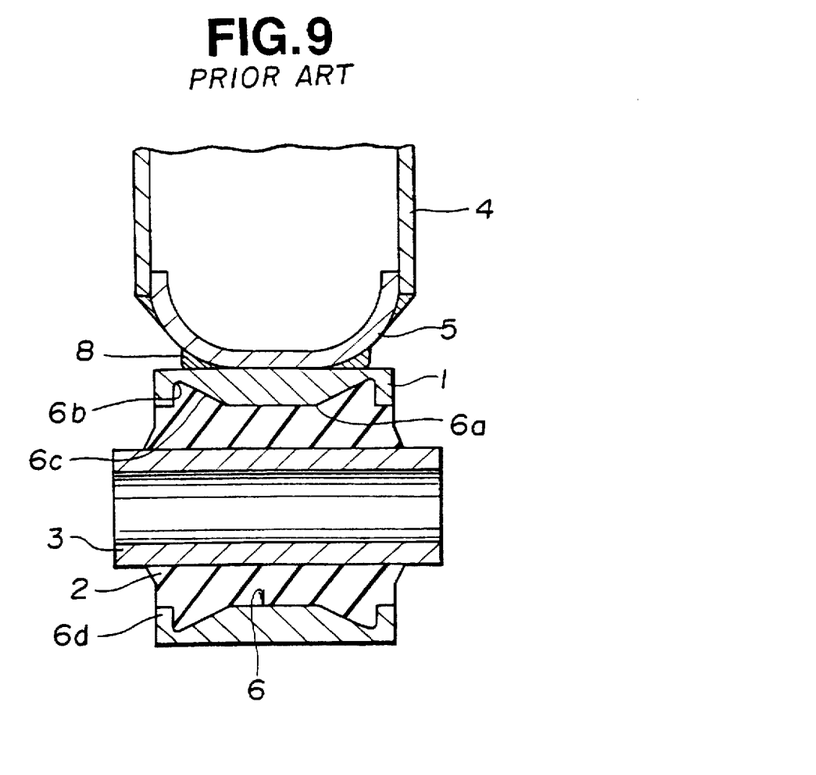
FIG. 9 shows a cross-sectional view of a conventional installation ring in an installed position thereof.
Figure 10:
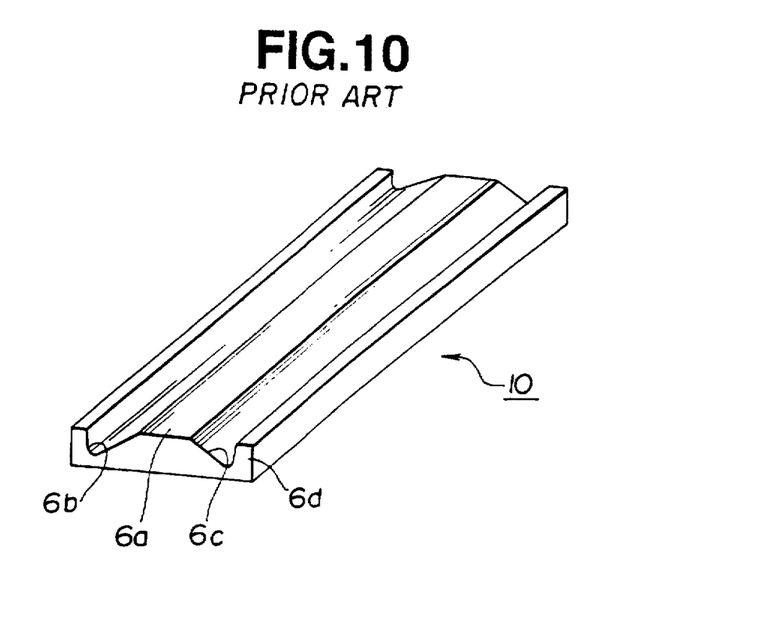
FIG. 10 shows a perspective view of surface contour of the installation ring of FIG. 9 as a flat article, before forming into a ring shape.

Generally, member 4 is attached to a base 5 via welded portions 8 or the like, to an installation ring 1 which is installed over an eye bush 2 which is fixedly installed on an installation shaft 3. The inner surface 6 of the installation ring includes a smaller circumference portion 6a, a concave portion 6b, an angled portion 6c and a edge ridge 6d. The installation ring is manufactured as a single flat article as seen in FIG. 10, which is then wrapped around the eye bush and attached by heat processing or the like. The contours of the opposed edges of the flat article therefore must align closely for effecting attachment. The outer surface of the eye bush 2 is configured to mate with inner surface 6 of the installation ring 1 and the concave portion 6b and the edge ridge 6d are provided to prevent the installation ring 1 from coming away from its mounting position around the eye bush 2. However, according to this, since when forming the flat article, providing the smaller circumference portion 6a requires material of substantial thickness to be used. Accordingly, costs are raised and attachment of the opposed ends for forming the ring is more difficult.

Further, generally some type of pipe material is used for forming the installation ring and the contoured portions such as the concave portion 6b and slanted portion 6c are cut out from a basic block of material which must be at least as thick as the smaller circumference portion 6a, thus processing requirements are increased and material removed for forming the concave portion 6b is wasted, further increasing costs.

In addition, when such a thick base material is used, bending processing for forming the installation ring becomes difficult and energy requirements, and thus costs, are again increased.

Thus it has been required to provide an installation ring for a pressurized fluid buffer device which can be produced at a substantially low base cost and which has fewer processing requirements.

SUMMARY OF THE INVENTION

Thus, it is an object of the present invention to overcome the drawbacks of the related art.

It is a further object of the invention to provide an installation ring for a pressurized fluid buffer device which can be produced at a substantially low base cost and which has fewer processing requirements for manufacture and installation.

According to one aspect of the invention, there is provided an installation ring for mounting a pressurized fluid buffer device, the installation ring to be retained on an eye bush affixed axially on a mounting shaft, comprising: a base material having a uniform thickness and being bent along a longitudinal axis of the base material to into an annular shape having a circumferential dimension predetermined for mounting on the eye bush; a central annular portion of the installation ring being indented such that the central annular portion is smaller in circumference than adjacent portions of an inner circumferential surface of the installation ring; and inwardly extending annular edge portions defining circumferences of first and second axial end opening of the installation ring, the indented central annular portion and the inwardly extending annular edge portions defining an annular concavity therebetween such that the inner circumference of the installation ring is contoured for securely fitting around the eye bush in an installed position.

Also, according to another aspect of the invention, there is provided a method of forming an installation ring to be retained on an eye bush affixed axially on a mounting shaft for mounting a pressurized fluid buffer device, comprising the steps of: forming a flat a base material component having predetermined width and length dimensions, the base material being of uniform thickness; applying press processing to the flat base material for providing a surface contour thereto including: a raised longitudinally extending central portion; raised longitudinal edge portions at both longitudinal sides thereof; and longitudinal concave portions defined inwardly adjacent of each of the edge portions at either side of the raised longitudinally extending central portion; applying bending processing for forming the contoured base material component into an annular configuration such that the raised longitudinally extending central portion is faced inwardly to form a reduced diameter portion of an inner surface of the installation ring, the raised edge portions further being oriented to extending inwardly according to the annular bending of the base component.

In addition, according to a further aspect of the invention, there is provided a method of forming an installation ring having an integral annular configuration formed around a central axis, the installation ring to be retained on an eye bush affixed axially on a mounting shaft for mounting a pressurized fluid buffer device, comprising the steps of: forming a flat a base material component having a predetermined shape and being of uniform thickness; applying press processing to central area of the flat base material forming a cylindrical article having an open first end and a closed second end; first bending processing at an annular wall of the cylindrical article axially outward for forming a first flanged end portion at the second closed end; second bending processing forming a second flanged end bending the wall of the cylindrical article axially outward at the first closed end, the first and second bending processing steps being applied to end portions of the wall such that a central portion of the wall is not subject to axially outward bending, thus defining a smaller diameter portion of an inner surface of the wall of cylindrical article; inwardly bending an annular edge of the first open end for forming an annular lip portion defining a first axial end opening; and forming a second opening axial end opening through the second closed end, axially aligned with the first opening such that an outer peripheral portion of the second closed end is retained for defining an annular lip around the second axial opening.

BRIEF DESCRIPTION OF THE DRAWWING

DESCRIPTION OF THE PREFERRED EMBODIMENT

Figure 1:
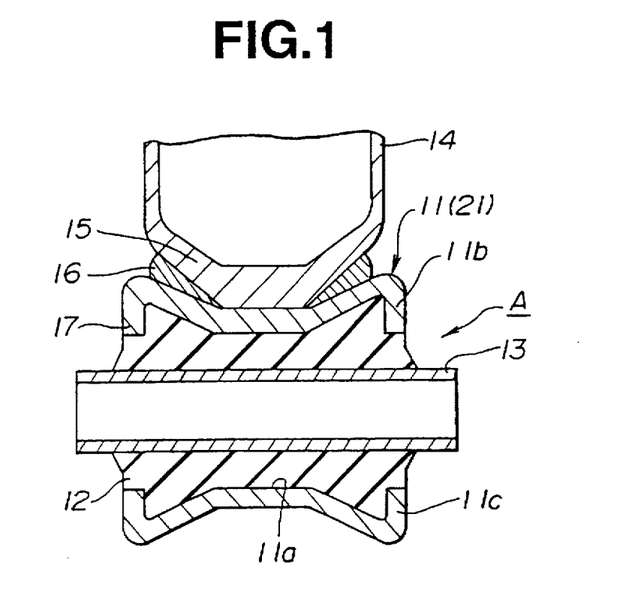
FIG. 1 shows a cross-sectional view of an installation ring for a pressurized fluid buffer device according to a first embodiment of the invention.

Hereinbelow, a preferred embodiment of the invention will be explained in detail with reference to the drawings. Referring to FIG. 1, a cross-sectional view of an installation ring 11 according to a first preferred embodiment of the invention is shown in an installed condition.

As may be seen, a main body portion of a buffer device 14 is shown having a base portion 15 which is attached at a specific position on the outer circumference of the installation ring 11 by welded portions 16 of the like. The installation ring 11 is closely fitted around an eye bush 12 which is fixedly attached to a mounting shaft 13.

Figure 2:
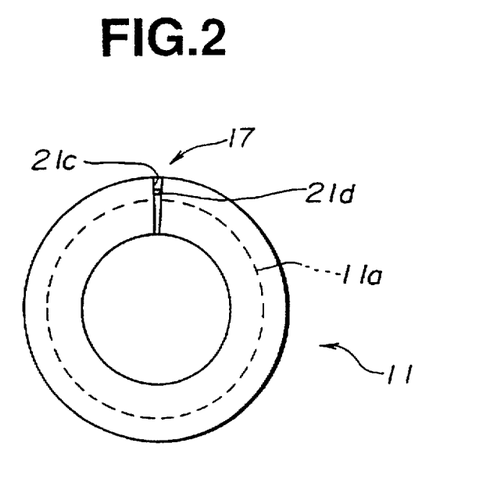
FIG. 2 is a side view of the installation ring of FIG. 1.
Figure 3:
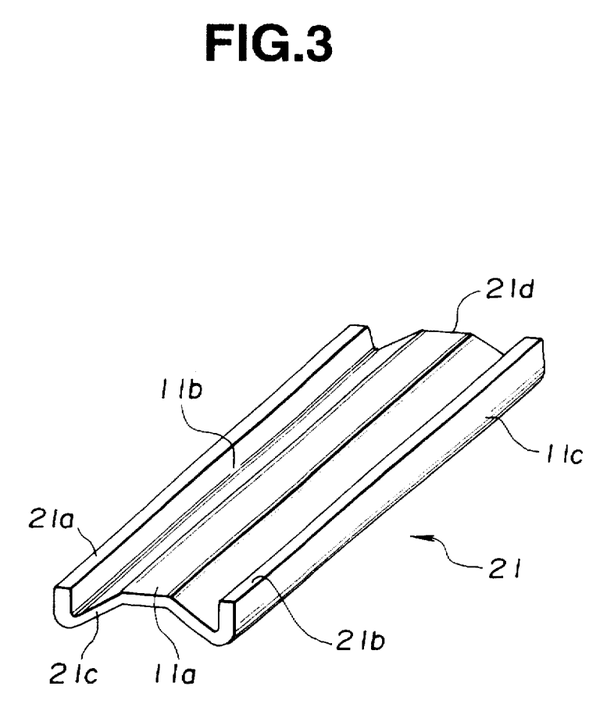
FIG. 3 is a perspective view of the configuration of a basic shape of the installation ring after manufacture and before installation according to the first embodiment.
Figure 4:
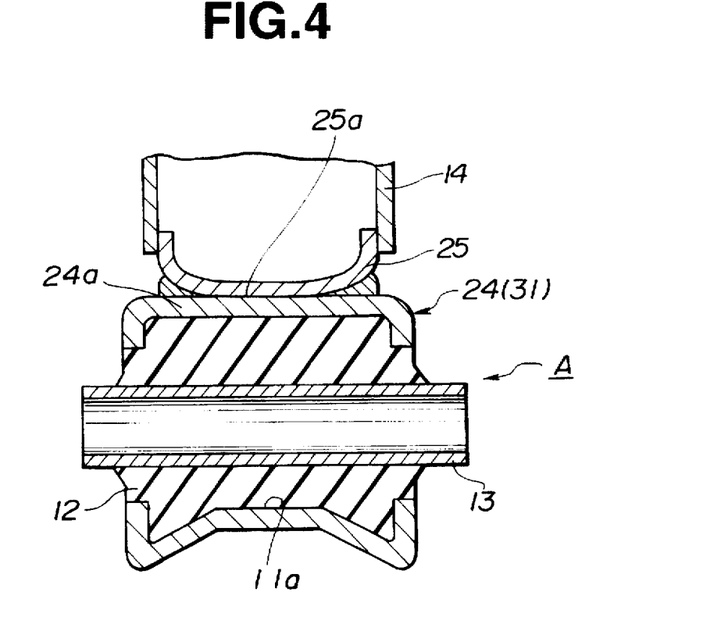
FIG. 4 shows a cross-sectional view of an installation ring for a pressurized fluid buffer device according to a second embodiment of the invention.

Referring to FIG. 3, it may be seen that the flat article formed for processing into an annular shape as the installation ring 1 is formed of a width of material having uniform thickness. The material is selected for strength and suitability for bending processing such as pressing, or the like for providing the contoured portions as seen in the drawings. According to the present embodiment, the flat, single thickness material is subject to press processing to form upwardly (in FIG. 3) curved longitudinal edge portions 21a, 21b and an upwardly bent flat central portion extending longitudinally for forming the smaller circumference portion 11a. Concave portions 11b are defined between the longitudinal edge portions 21a, 21b and the smaller circumference portion 11a and the outer surface of the flat article of the installation ring 11 where the longitudinal edge portions are upwardly curved each form an edge ridge 11c. Thus, when the flat article is subjected to heat and/or pressure processing for bending around the eye bush 12 for forming the installation ring, the concave portions 11b and the edge ridges 11c act to securely retain the installation ring to the eye bush just as with the conventional constructions. Further, as seen in FIG. 2, a edge mating position, or seam 17 at which opposed width ends 21c, 21d of the flat article meet, when processing for bending the article into the annular shape of the installation ring 11 can be used for precisely determining the position at which the buffer device 14 is attached to the installation ring. That is, the installation ring may be installed such that the welded portions 16 for attaching the buffer device 14 also serve to attach the width ends 21c, 21d of the installation ring 11 to each other for effecting secure attachment of the installation ring 11 to the eye bush 12 and the buffer device 14 to the installation ring 11, in a single processing step. In addition, according to contouring the installation ring from a single thickness material by press processing or bending, a contour of the outer circumference of the installation ring may be determined as best suited for attachment of the base portion; 15 of the buffer device.

Thus, all the advantages of the conventional structure are obtained while improved features are also present and overall manufacturing and processing costs are reduced.

Referring to FIGS. 4 to 7 a second embodiment of the invention will be described. Description common to the above described first embodiment will be omitted for brevity.

Figure 5:
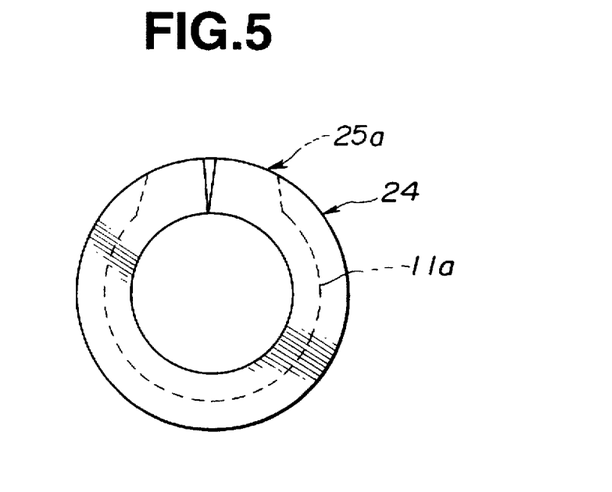
FIG. 5 is a side view of the installation hub of FIG. 4.
Figure 6:
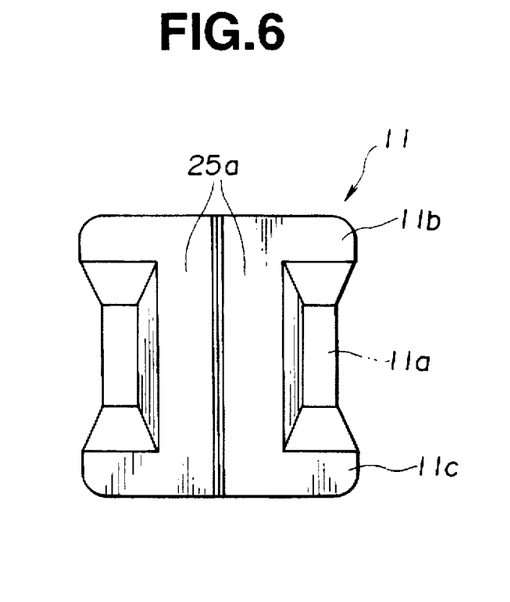
FIG. 6 is a plan view of surface joining resulting from forming the installation ring of FIG. 4.
Figure 7:
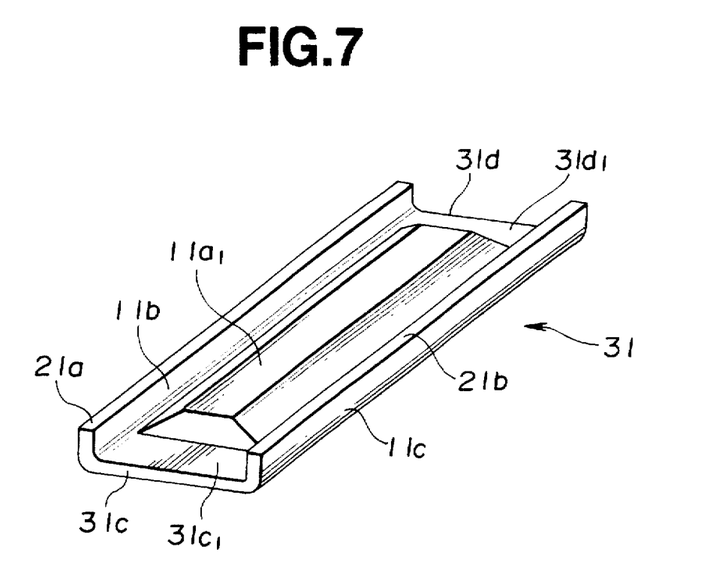
FIG. 7 is a perspective view of the installation ring of FIG. 4 before being formed into a ring shape.
Figure 8A:
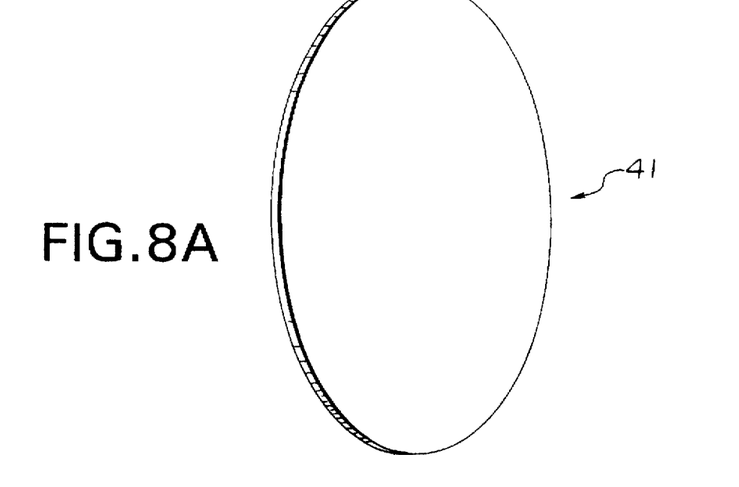
FIGS. 8(A), 8(B), 8(C), and 8(D) show a forming process for an installation ring according to a third preferred embodiment of the invention.
Figure 8B:
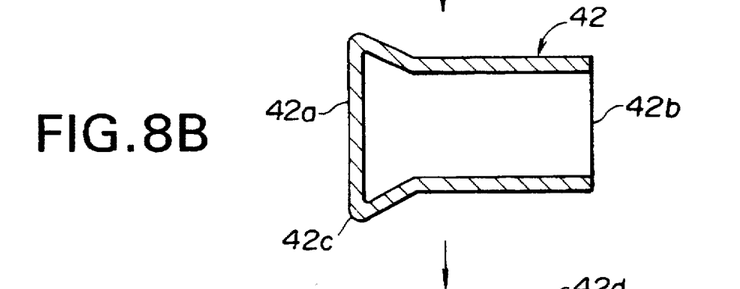
Figure 8C:
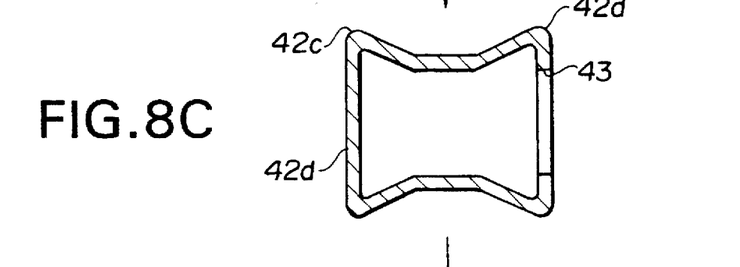
Figure 8D:
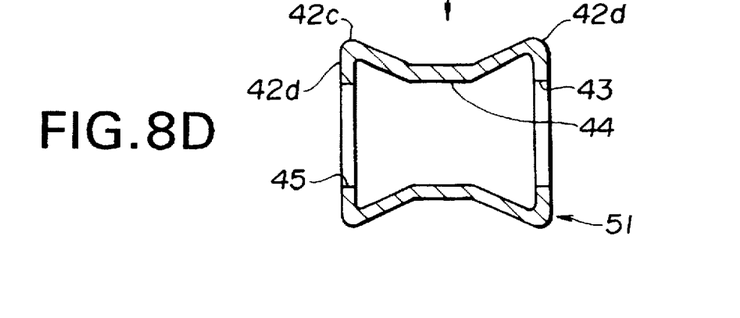

As may be seen, according to the structure of buffer device 14 to be installed on the installation ring 11 of the second embodiment. The base portion is not formed integrally with the housing of the buffer device 14 but is installed as a separate component, base portion 25. The base portion 25 is attached at a predetermined position of the installation ring by welded portions 24a. As may be seen, according to this arrangement it is desired to provide an installation ring 11 having a flat, or uncontoured area 24 for defining an installation pad 25a corresponding to the installation position of the buffer device 14 while retaining the secure fitting properties of the smaller circumference portion 11a, the concave portion 11b and the edge ridges 11c as with the previous embodiment. Thus, referring to FIG. 7, a flat article for forming the installation ring is formed as shown. As may be seen, according to the second embodiment, a raised, longitudinally extending central portion having a flat top surface is formed by pressing, or the like for acting as the smaller circumference portion 11a(1), according to this flat end surface areas 31c(1), 31d(1) are provided between the width ends 31c, 31d of the article and the longitudinal ends of the raised area of the smaller circumference portion 11(1). Thus, as seen in FIGS. 5 and 6, when bending processing is carried out for forming the annular shape of the installation ring 11, a level, uncontoured section of the installation ring is formed on either side of the seam 17 which level area acts as the installation pad 25a for receiving the lower side of the base 25 of the buffer device.

As with the previous embodiment, the welded portions 24 for attaching the buffer device 14 also serve to attach the width ends 31c, 31d of the installation ring 11 to each other for effecting secure attachment of the installation ring 11 to the eye bush 12 and the buffer device 14 to the installation ring 11, in a single processing step. In addition, according to contouring the installation ring from a single thickness material by press processing or bending, various configurations of the outer circumference of the installation ring are available according to which is best suited for attachment of a particular buffer device.

Referring now to FIGS. 8(1) to 8(4), a third embodiment of an installation ring according to the invention will be described in detail. According to the third embodiment, an installation ring 51 is formed of a single piece of material having uniform thickness. For example, the circular piece of base material 41 as shown in FIG. 8(1), then, by stamping, or punch processing or similar, a cylindrical article 42 is produced having a flanged end portion including closed end 42 and edge ridge 42c. Then, in a subsequent processing step as seen in FIG. 8(3), bending processing is carried out form forming a second flanged end inwardly bent annularly for forming second edge ridge 42d and defining an opening 43. According to bending of the first and second end portions in a flanged, or flared configuration an inner smaller circumference portion 44 is defined. Then, finally, a second opening 45, axially aligned with the first opening 43 is formed and an installation ring 51 according to the third embodiment is completed. According to this method, the annular shape of the ring is established during processing for contouring the flat base material 41, thus no additional bending processing is required for installation. Further, high mechanical strength and precise shaping can be assured.

Thus, according to the present invention as described herein above, there is provided a installation ring for a pressurized fluid buffer device which is low in cost, conserves base material and offers great flexibility in design variation and base material.

Further, according to the structure of the invention as herein set forth, a method of forming an installation ring is provided by which the above advantages are obtained and in which mechanical strength is increased and installation processing is reduced. Thus, costs are minimized while greater advantages are realized than according to conventional structures.

It will be noted that, although the preferred embodiment is set forth in terms of an installation ring for use with a pressurized fluid buffer device, the present invention may be embodied in various different ways without departing from the principle of the invention as herein set forth.

The present invention in not limited only to the description as herein disclosed but may be modified and embodied in other ways without depart from the scope or inventive concept of the invention as set forth above.

What is claimed is:

1. An installation ring for mounting a pressurized fluid buffer device, said installation ring to be retained on an eye bush affixed axially on a mounting shaft, comprising:

a base material having a uniform thickness and being bent along a longitudinal axis of said base material to into an annular shape having a circumferential dimension predetermined for mounting on said eye bush;

a central annular portion of said installation ring being indented such that said central annular portion is smaller in circumference than adjacent portions of an inner circumferential surface of said installation ring; and inwardly extending annular edge portions defining circumferences of first and second axial end openings of said installation ring, said indented central annular portion and said inwardly extending annular edge portions defining an annular concavity therebetween such that said inner circumference of said installation ring is contoured for securely fitting around said eye bush in an installed position;

wherein a seam which divide an annular continuity of said based material as a result of annular bending of said base material is utilized as an installation position for mounting said buffer device such that an attachment mechanism attaching said buffer device to said installation ring further effects attachment of facing sides of said seam.

2. An installation ring as set forth in claim 1, wherein an indented area of said central annular portion extends only around a preselected extent of an annular circumference of said installation ring, a non indented portion of said central annular portion being utilized as a mounting pad for attachment of a base potion of said buffer device.

3. An installation ring as set forth in claim 2, wherein said mounting pad corresponds to an area on opposing sides of said seam.

4. An installation ring, having an axis, for mounting a hydraulic shock absorber for an automotive vehicle, the installation ring comprising:

a material with a uniform thickness, the material including:

two mutually opposed end portions meeting each other to define a seam that is utilized as an installation site for mounting the hydraulic shock absorber;

two axially spaced edge portions and a central portion positioned between the edge portions, the edge portions and the central portion extending about the axis between the end portions; and axially spaced concave portions extending about the axis between the end portions, one of the concave portions being positioned between and operatively connected between one of the axially spaced edge portions and the central portion, the other of the concave portions being positioned between and operatively connected between the other of the axially spaced edge portions and the central portion.

5. A mount structure comprising:

a mounting shaft;

a hydraulic shock absorber having a base portion;

an eye bush surrounding and fixedly attached to the mounting shaft; and an installation ring having an axis, the installation ring surrounding the eye bush and comprising a material with a uniform thickness, the material including:

two mutually opposed end portions meeting each other to define a seam that is utilized as an installation site for mounting the hydraulic shock absorber, the installation site being attached to the base portion and the opposed end portions being attached to each other;

two axially spaced edge portions and a central portion positioned between the edge portions, the edge portions and the central portion extending about the axis between the end portions; and axially spaced concave portions, one of the concave portions being positioned between and operatively connected between one of the axially spaced edge portions and the central portion, the other of the concave portions being positioned between and operatively connected between the other of the axially spaced edge portions and the central portion;

wherein the concave portions and the edge portions engage the eye bush to securely retain the installation ring to the eye bush.

* * * * *

UNITED STATES PATENT AND TRADEMARK OFFICE
CERTIFICATE OF CORRECTION

PATENT NO. : 5,794,741
DATED : August 18, 1998
INVENTOR(S) : Kimihisa KASAJIMA et al.

It is certified that error appears in the above-identified patent and that said Letters Patent is hereby corrected as shown below:

On Front Cover, at Item [73] Assignees, after Nissan Motor Co., Ltd., "Keiaisha Seisakuso Co., Ltd." should read:

--Keiaisha Seisakusho Co., Ltd.--.

Signed and Sealed this

Seventh Day of September, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO.  : 5,794,741
DATED       : August 18, 1998
INVENTOR(S) : Kimihisa KASAJIMA et al.

It is certified that error appears in the above-indentified patent and that said Letters Patent is hereby corrected as shown below:

On the title page, Item [73] Assignees, before Nissan

Motor Co., Ltd. please insert:

--Unisia Jecs Corporation, Kanagawa, Japan;--

Signed and Sealed this

Twenty-third Day of November, 1999

Attest:

Q. TODD DICKINSON

*Attesting Officer*          *Acting Commissioner of Patents and Trademarks*